July 15, 1947.  E. A. VERRINDER  2,424,006
FRUIT MARKING MACHINE
Filed Dec. 15, 1941    6 Sheets-Sheet 3

INVENTOR:
ERNEST A. VERRINDER
BY
ATTORNEY

July 15, 1947.  E. A. VERRINDER  2,424,006
FRUIT MARKING MACHINE
Filed Dec. 15, 1941  6 Sheets-Sheet 4

INVENTOR:
ERNEST A VERRINDER
BY
ATTORNEY

July 15, 1947. E. A. VERRINDER 2,424,006
FRUIT MARKING MACHINE
Filed Dec. 15, 1941 6 Sheets-Sheet 6

INVENTOR:
ERNEST A. VERRINDER
BY
ATTORNEY

Patented July 15, 1947

2,424,006

UNITED STATES PATENT OFFICE 2,424,006

FRUIT MARKING MACHINE

Ernest A. Verrinder, Redlands, Calif., assignor to Food Machinery Corporation, San Jose, Calif., a corporation of Delaware Application December 15, 1941, Serial No. 422,970

9 Claims. (Cl. 101—35)

This invention relates to marking machines and has particular utility in trade-marking individual fruit entities.

Included among the objects of the invention are the objects of providing such a machine which will have a relatively large capacity; one which will handle an intermittent flow of fruit without applying an excess quantity of ink to any of the fruit entities; one which handles the fruit relatively gently; one which is adapted to trade-mark ovaloid fruit entities and apply the mark uniformly substantially in the plane of minimum diameter; and one which will with one handling of ovaloid fruit so mark the same and return this fruit to any desired level.

The invention is especially useful in marking melons and it is a further object to provide such a machine by which melons may be uniformly marked. For illustrative purposes the invention will be disclosed herein, as embodied in a melon marking machine.

The manner of accomplishing the foregoing objects, as well as further objects and advantages, will be made manifest in the following description taken in connection with the accompanying drawings in which:

Referring specifically to the drawings, the marking machine 20 shown therein includes a frame 21 which provides a housing for a conveyor 22 and also supports a printing mechanism 23 and a drive mechanism 24.

Frame 21

Supporting the rest of the frame and resting on the floor is a vertically telescopic base 26. This includes inner side channels 27 having vertical slots 29 provided therein and connected crosswise by channels 30. At their lower ends the channels 27 have feet 31 which rest on the floor. Slideably embracing the channels 27 are outer channels 32 having bolts 33 which extend through the slots 29 and unite the channels 27 and 32 at whatever telescopic relation it may be desired to fix these together.

Supported on top of the channels 32 are side frame members 38 and 39 which have inturned edge flanges 40, the latter being connected by channel member 41 and angle iron members 42, 43, 44, 45. Adjustably connected by bolts 50 to the side members 38 and 39 is a delivery board angle iron 51 which supports a discharge delivery board 52. At the opposite end of the machine the side members 38 and 39 support an intake delivery board 53.

The frame also includes short side standards 54 which are connected by channel irons 55 and 56, by a tube 57, and has angle iron ink reservoir supports 58.

Figure 1:
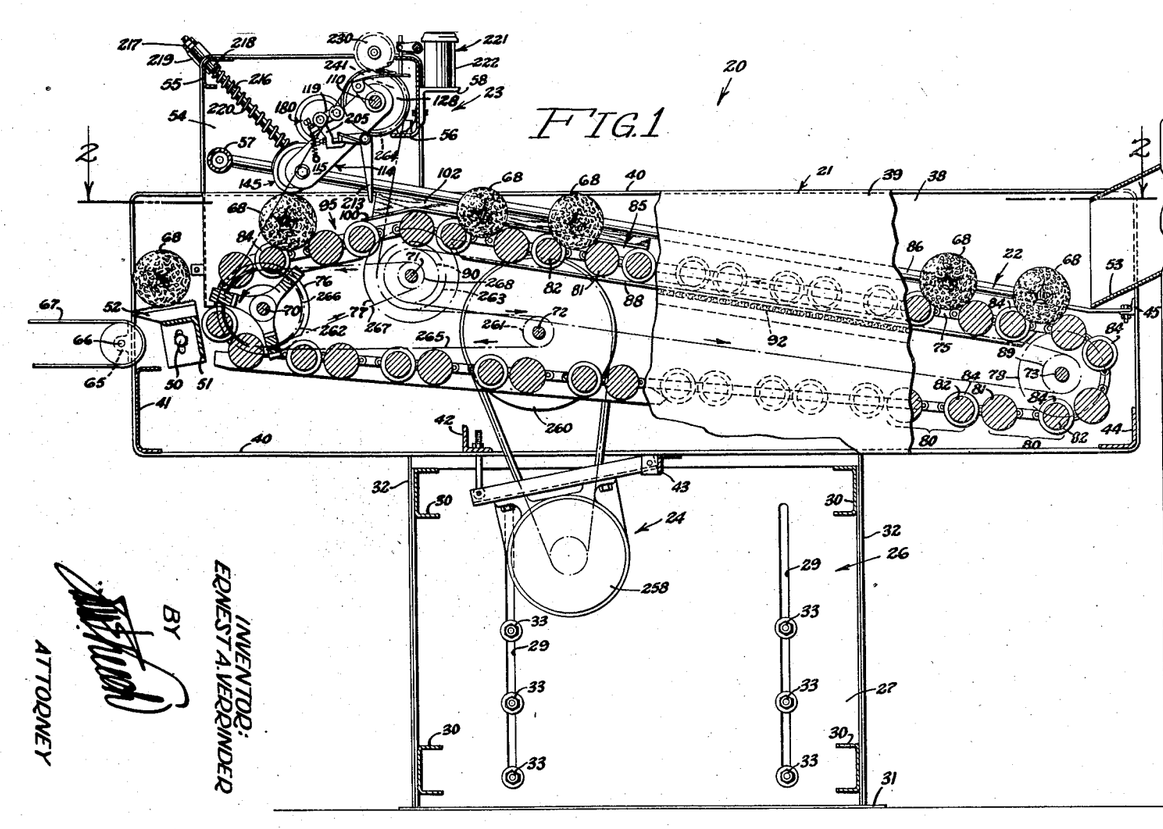
Fig. 1 is a side elevational view of a preferred embodiment of the invention mainly broken away to illustrate the interior construction thereof.

The members 38 and 39 support bearings 65 in which is journalled an idle shaft 66 of a discharge conveyor belt 67 onto which rollable articles, such as melons 68, are adapted to roll from the discharge delivery board 52 (see Fig. 1).

The side frame members 38 and 39 also have suitable bearings in which are journalled shafts 70, 71, 72 and 73.

Conveyor 22

This is an endless conveyor having endless chains 75 which are trained about sprockets 76, 77 and 78 mounted respectively on shafts 70, 71 and 73. Pivotally mounted between the chains 75 are a series of pairs 80 of rollers 81 and 82, the rollers 81 being cylindrical and the rollers 82 being round with a series of annular channels 84. A portion 85 of the upper flight of the conveyor 22 is upwardly inclined and guard rails 86, the opposite ends of which are secured to the angle iron 45 and the tube 57, divide the space just above this flight into a series of lanes 87. Rotatable objects, such as melons 68, which are fed to the conveyor 22, are conveyed in single file rows of articles along these lanes. To accomplish this the shaft 70 is rotated in the direction of the adjacent arrow in a manner to be pointed out hereinafter.

Figure 2:
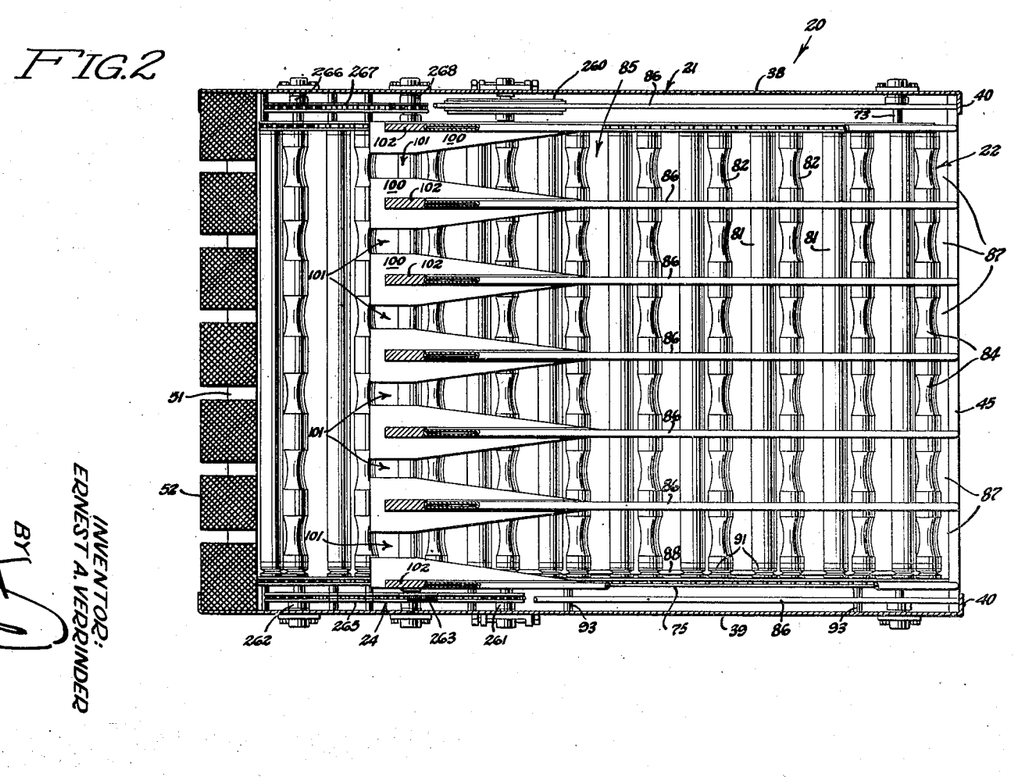
Fig. 2 is a horizontal sectional view taken on the line 2—2 of Fig. 1.

While this is being done the rollers 81 and 82 in the upwardly inclined portion of the conveyor are reversely rotated by a belt 88 which is diagrammatically shown in Fig. 1 as being trained around a pulley 89 on the shaft 73 and a pulley 90 on the shaft 71, this belt being driven by the latter. The belt 88 passes under the rollers 81 and 82 at one side of the machine (see Fig. 2) where pulleys 91 which are built into these rollers rest on this belt so that the adjacent ends of these rollers are supported by this belt. The belt 88 in turn is supported by a stationary section of roller chain 92 which is mounted by spacers 93 (see Fig. 2) on the side frame member 39.

The upwardly inclined portion 85 of the conveyor 22 lies between the sprockets 77 and 78. That portion 95 which lies between the sprockets 76 and 77 is downwardly inclined along a straight path so that when rollable articles are delivered from the conveyor 22 onto the discharge delivery board 52 they will pass on to the belt 67 at substantially the same level as when they are delivered onto conveyor 22 from the intake delivery board 53.

The rollers in each given pair 80 are spaced farther apart than the distance adjacent pairs are spaced apart. This results in each of the rotatable articles 68 always coming to rest between the rollers of one of these pairs and never between adjacent rollers of adjacent pairs. The rollable articles 68 are thereby properly spaced as they are fed up the several lanes 87 of the conveyor 22 to the printing mechanism 23. By virtue of the relation of the channels 84 of the rollers 82 and the cylindrical surface of the roller 81 of each of the pairs 80 of conveyor rollers, and by virtue of the upward inclination of the section 85 of the conveyor, and by virtue of the reverse rotation of the rollers in this section by the spinner belt 88, the rotatable articles 68, when these are ovaloid in character, are all, during their passage up one or the other of the lanes 87, brought into positions in which their major axes are disposed transversely of the direction of their travel on the conveyor.

It is to be noted that after the conveyor 22 has thus conveyed the articles 68, these articles continue to be supported in properly aligned position as they are delivered to the printing mechanism 23 and while the printing mechanism is operating on these articles.

To aid in centralizing the rollable articles 68 in each of the lanes 87, as these articles approach the upper end of this lane, fabric or sheet rubber flaps 100 are provided to converge inwardly from opposite sides of each of these lanes to leave only a narrow space 101 in the middle of each lane at the upper end thereof which is uncovered by these flaps. Wooden fillets 102 supported on the guide rails 86 support the flaps 100 along their lower edges, the fillets 102 conforming to the change in direction followed by the conveyor 22 where the upwardly inclined section 85 joins the downwardly inclined section 95.

Printing mechanism 23

The side standards 54 are provided with suitable bearings 108 and 109 in which is journalled a printing mechanism drive shaft 110. This shaft is also supported (see Fig. 3) by one or more bearings 111 bolted to the channel beam 56. Mounted on the shaft 110 and the channel 55 is a series of printing units 114, two of these being shown in plan in Fig. 3. One of the units 114 is provided for each lane 87 and is so positioned as to print a mark on each of the rotatable articles 68 traveling therebeneath in that lane.

Each unit 114 (see Figs. 4, 5, 8 and 9) includes a chain housing arm 115, this arm having a bearing 116 at its upper end which rotatably receives the shaft 110. This arm also has a stud shaft bearing 117 at its lower end, a spring mounting boss 118, a paddle pin boss 119, a form roller mounting boss 120 and a ratchet spring arm 121. The boss 118 has a screw 125, the boss 120 has a set screw 126 and the boss 119 (see Fig. 7) has a set screw 127.

Each unit 114 also includes a fountain roller 128 which is mounted on the shaft 110 and fixed thereto by a set screw 129. Formed integral with the fountain roller is a cam 130 having a high sector 131 and a low sector 132. Disposed between the roller 128 and the bearing 116 of the chain housing arm 115 is a chain sprocket 134 which is keyed to the shaft 110. The sprocket 134 and the bearing 116 are held in closely spaced relation with the roller 128 by a collar 135 fixed on the shaft 110.

Extending through the bearing 117 is the threaded shank 136 of a stud shaft 137, a nut 138 on this shank rigidly securing the shaft 137 to the bearing with a shoulder 139 of the shaft pressed against said bearing. Rotatably mounted on the stud shaft 137 is a sector-like printing rotor 145 having a sprocket 146 formed thereon. Also rotatably received by the shaft 137 is a sleeve 147, this sleeve and the rotor 145 being held in closely spaced relation with the bearing 117 by a washer 148 and cotter pin 149. Housed within the chain housing arm 115 and trained about sprockets 134 and 146 is a roller chain 150. The shank 136 of the stud shaft 137 is slightly eccentric relative to this shaft, so that by rotation of this shaft the tightness of the chain 150 may be adjusted, any particular adjusted degree of tightness in this chain being maintained by tightening up on the nut 138 so as to retain the shaft 137 in a given rotational position.

The printing rotor 145 has a sector-like body 155, preferably made of metal or any rigid material and including a hub 156 and a rim 157.

The rim 157 has a pair of recesses 158 near its opposite edges in which are received endless rubber tires 160. Formed in the rim 157 between the tire recesses is a bayonet slot 161 having ledges 162 along its upper edges. The portion of the rim 157 in which the bayonet slot 161 is formed is preferably concentric with the hub 156, and constitutes the portion of the rim 157 having the greatest radius. The rim 157 also has radial holes 163. Formed in the hub 156 on the bottom of the bayonet slot 161 (see Figs. 11, 12 and 13) are a number of spring receiving bores 164. Held downwardly in the bayonet slot 161 by pins 165, which are secured in place in the holes 163 by cotters 166, is a leaf spring 167, this leaf spring being normally held outwardly against the heads of the pins 165 by light coiled compression springs 170 disposed in the bores 164. Shoulders 171 formed on the pins 165 extend through holes in the opposite ends of the leaf spring 167 and space the heads of these pins from the bottom of the bayonet slot 161. The spring 167 has rigidly fixed thereon end posts 172.

Figures 11, 12, 13, 14:
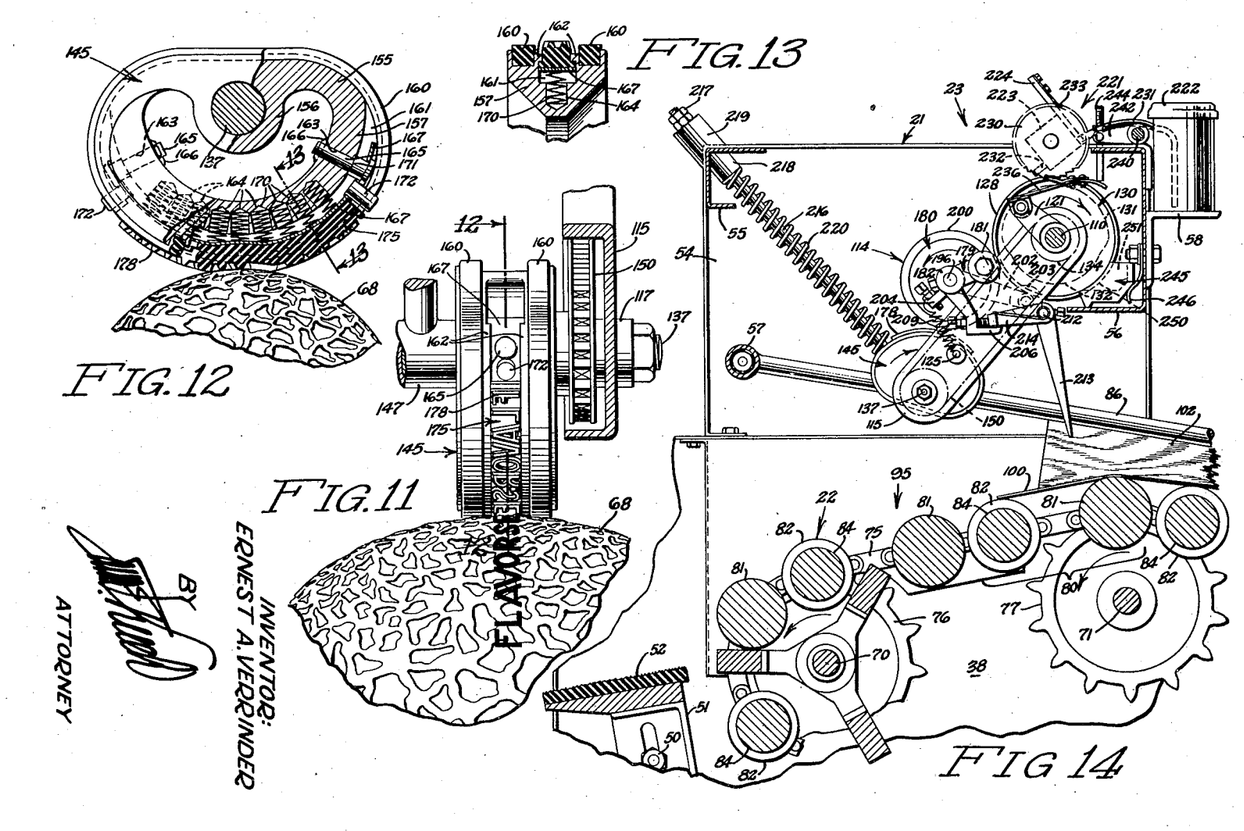
Fig. 11 is an enlarged fragmentary detail view ilustrating the eccentric printing rotor of the invention while printing a trade-mark on a melon.
Fig. 12 is a cross sectional view taken on the line 12—12 of Fig. 11.
Fig. 13 is a detail view taken on the line 13—13 of Fig. 12.
Fig. 14 is an enlarged view similar to that portion of Fig. 1 showing the printing mechanism of the invention and illustrating a unit of the latter in inactive position in which the printing die is not inked.

A rubber printing stamp 175 is shaped so as to lie within the upper portion of the bayonet slot 161 and extend under the ledges 162 thereof when squeezed down into this slot by depressing the leaf spring 167, and then allowed to expand and return under the propulsion of this leaf spring and the coiled springs 170 against the ledges 162. The outer face of the stamp 175 is provided with type characters 178 which extend outwardly just beyond the periphery of the tires 160. Thus the type characters 178 extend beyond the tires 160 enough so that they can be coated with ink without inking the tires, and yet when the rotor comes into rolling contact with one of the articles 68 (as shown in Fig. 12) the printing stamp 175 and the spring 167 yield inwardly so that the type characters 178 are pressed against the articles 108 with a relatively light pressure, the main pressure of the contact between the rotor and the article being taken up by the tires 160. This is of great importance in increasing the useful life of the rubber stamp 175.

The posts 172 save the endmost printing characters 178 from excessive wear, these posts performing this function by engaging the article 68 and depressing the spring 167 beneath the endmost portions of the stamp 175, thus preventing an excessive erosion of the endmost characters as would otherwise occur due to the fact that they are the first and the last, respectively, of the characters to be in contact with the article 68 and thus tend to have slightly greater frictional contact with the articles than the characters in the middle of the stamp which are somewhat supported by the characters on opposite sides thereof.

Another advantage of the mounting of the rubber printing stamp 175 is the ease with which this can be replaced. When this becomes necessary one end of the spring 167 may be depressed by pressing down on the adjacent post 172 which leaves the corresponding end of the stamp 175 free to be pulled upwardly from the bayonet slot 161, after which the entire stamp can readily be stripped from this slot and another stamp inserted by pressing it downwardly in the slot until it depresses the leaf spring 167 and allows the stamp to expand to its normal shape so as to extend beneath the ledges 162 (as shown in Fig. 13) and thereafter releasing the stamp to permit the spring 167 to press it upwardly against these ledges.

Mounted between the fountain roller 128 and the printing rotor 145 on a bracket 179 is a form roller 180. The bracket 179 has two bearing sleeves 181 and 182 which are connected by an arm 183. Extending rotatably through a bushing 184 provided in the sleeve 181 is a stub shaft 185 having an eccentric shank 186, the latter fitting into a bore 187 formed in the boss 120. The stub shaft 185 has a hexagonal head 188 by which the shaft 185 may be turned for adjustment purposes, as will be made clear hereinafter. This shaft may be retained in any adjusted position by tightening the set screw 126 onto the eccentric shank 186.

The sleeve 182 has a bore 192 at one end thereof and a counter bore 193 extending through the balance of the sleeve. Formed in the sleeve 182 is a pair of directly opposite holes 194 through which a bolt 195 extends, this bolt being threadedly received by a threaded aperture in a form roller axle 196 which fairly closely fits the bore 192 but is loosely received by the counter bore 193. Thus by an adjustment of the bolt 195 and lock nuts 197 provided thereon, an adjustment in the angular position of the axle 196 in the sleeve 182 may be effected. The form roller 180 is freely rotatable on the axle 196. This roller has a central bearing bushing 199, and on its periphery a flat rubber tire 200. This tire is of such diameter as to be tangent at all times with the periphery of the fountain roller 128.

Figures 6, 7, 8, 9, 10:
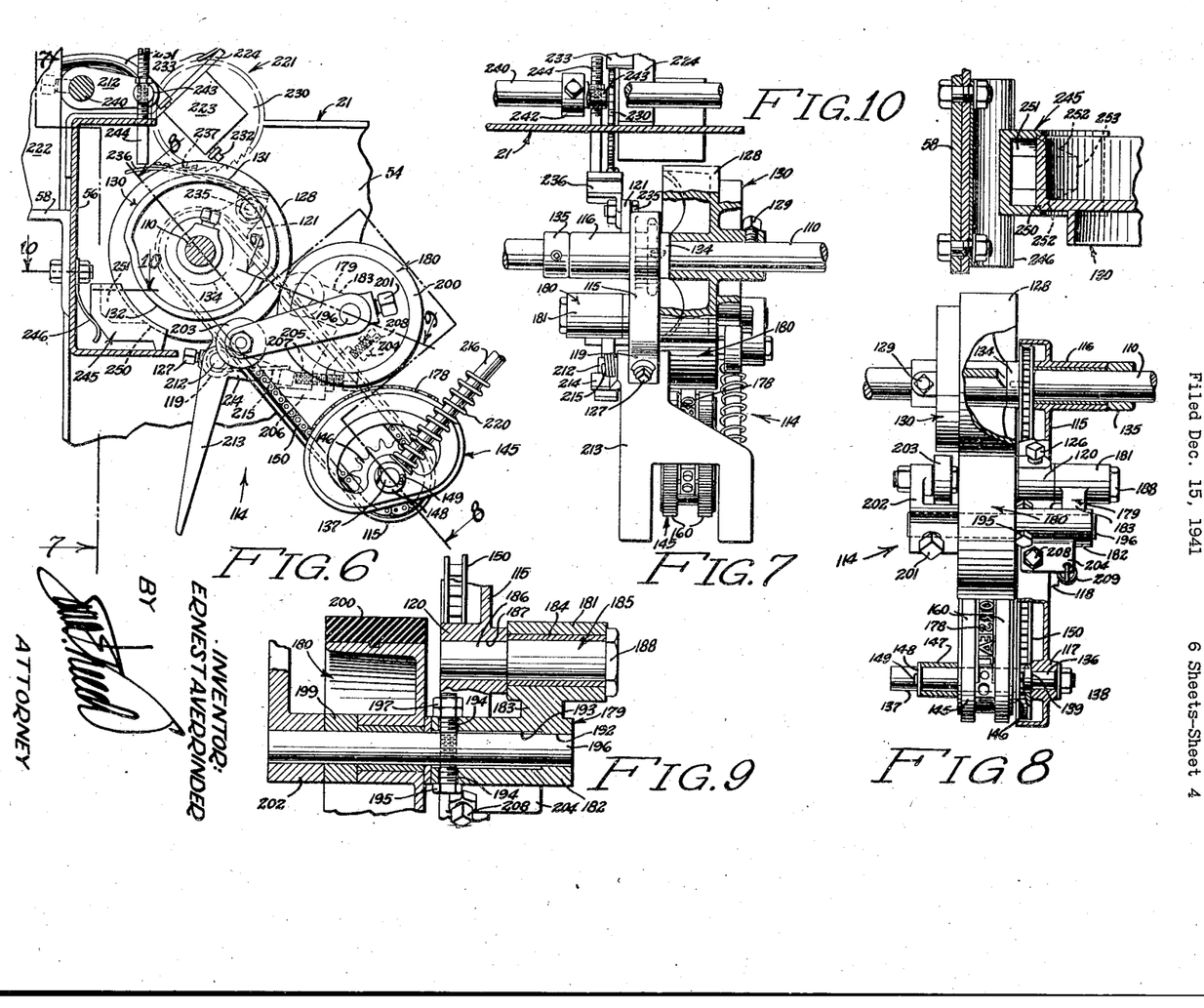
Fig. 6 is a cross sectional view taken on the line 6—6 and including a side elevation of one of the aforesaid printing units.
Fig. 7 is a vertical sectional view taken on the line 7—7 of Fig. 6, showing a rear elevation of a printing unit with portions thereof broken away to illustrate its construction.
Fig. 8 is a sectional view taken on the line 8—8 of Fig. 6.
Fig. 9 is an enlarged detail sectional view taken on the line 9—9 of Fig. 6.
Fig. 10 is an enlarged sectional view taken on the line 10—10 of Fig. 6 and illustrating the ink shearing shoe of the invention.

Fixed on the outer end of the axle 196 by a set screw 201 is a cam roller arm 202, the end of which is provided with a freely rotatable cam roller 203. The roller 203 (as shown in Fig. 8) is positioned in the plane of the cam 130 and sufficiently close to this cam so that rotation of the latter engages this roller and rocks upwardly the bracket 179 and the form roller 180 carried thereby.

The bracket 179 also includes a forwardly extending lug 204 and a downwardly extending leg 205, the latter having a foot 206 at its lower end. Provided in the leg 205 is a set screw 207 which is lock-nutted to permit fixing it in a given position. The lug 204 is also provided with a set screw 208 similarly lock-nutted. Connected by one of its ends to the lug 204 and by its other end to the screw 125 is a contractile spring 209.

Figure 15:
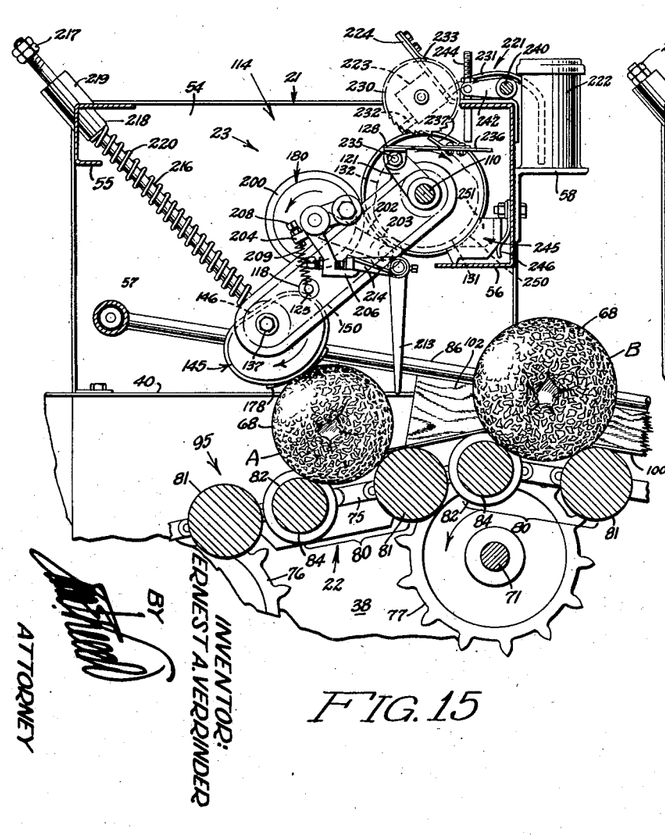
Fig. 15 is a view similar to Fig. 14 and illustrating the printing die while the fountain control paddle is released and returned to normal position after being engaged by one melon and in readiness to be engaged by the next on-coming melon.

Extending through the boss 119 and fixed therein by set screw 127 is a paddle shaft 212. The two prongs of a bifurcated upper end of an article responsive paddle 213 extend close to opposite sides of the boss 119 and are pivotally received by the shaft 212. The paddle 213 has an arm 214. An extending end of shaft 212 carries a coiled spring 215, one end of which is imbedded in the shaft and the other end of which engages the arm 214 in order to urge the paddle 213 to rotate so as to swing the arm 214 downwardly. The end of the arm 214, when thus swung downwardly, engages the foot 206 of the leg 205 (as shown in Figs. 13 and 15), so that when this arm is thus disposed downwardly and the cam roller 203 rides off the high sector 131 of the cam 130 and opposite the low sector 132 of this cam, the set screw 207 will contact the end of the arm 214 and thus any further lowering of the form roller 180 will be prevented.

Figure 16:
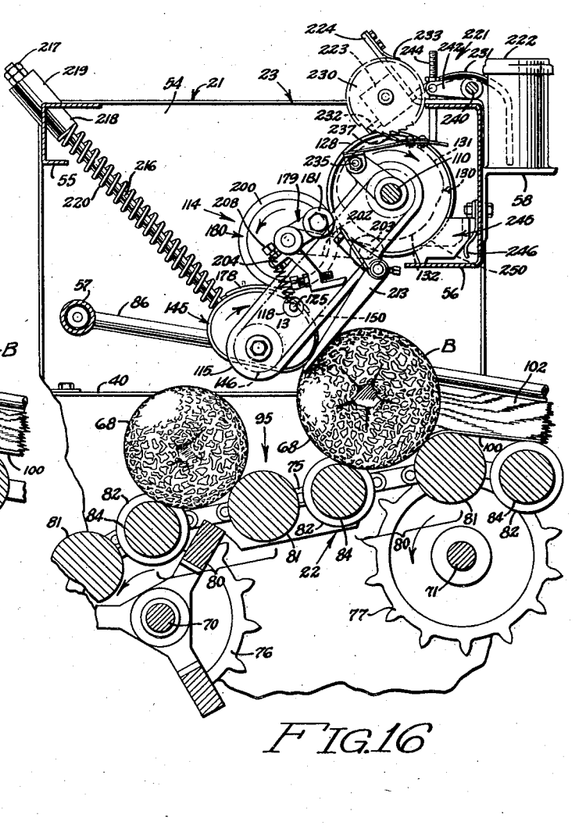
Fig. 16 is a view similar to Fig. 15 and illustrates the first melon moving away from the inking unit after having been marked thereby and the next melon engaging the fountain control paddle to cause the printing rotor die to be supplied with a fresh coating of ink just before this die comes into rolling contact with the second melon.

The sleeve 147 of each unit 114 has a rod 216 (see Figs. 6 and 15) rigidly secured thereto, this rod extending obliquely upwardly through a suitable hole provided in the channel 55. The upper end of this rod is provided with lock nuts 217, a bronze sleeve 218 and a rubber sleeve 219, said sleeves surrounding this rod at points respectively just above and just below the place where this rod passes through the beam 55. Surrounding each rod 216 is an expansive coiled spring 220, the opposite ends of which bear against the sleeve 147 and the bronze sleeve 218 and by its expansive force presses the printing rotor 145 against an article being marked, and after the marking is over returns the printing unit to its lowermost position in which the lock nuts 217 rest against the rubber sleeve 219 (as shown in Fig. 16).

Each printing unit 114 also includes an ink pumping device 221 having an ink reservoir 222 resting on one of the supports 58 and an ink pump 223 which is mounted on a strap 224 fixed on the channel 56. The pump 223 may be of any suitable type but is preferably of the general type shown in U. S. Letters Patent No. 2,123,781. This pump is adapted to be operated by the rotation of a ratchet wheel 230 to suck liquid ink from the reservoir 222 through a tube 231 and discharge this ink from a nozzle 232 onto the fountain roller 128. Provided on the strap 224 is a spring latch 233 which engages the teeth of the ratchet wheel 230 to prevent its reverse rotation. Connected by a bolt 235 to the arm 121 of the chain housing arm 115 is a dog supporting leaf spring 236 on which is mounted a ratchet dog 237.

Figure 3:
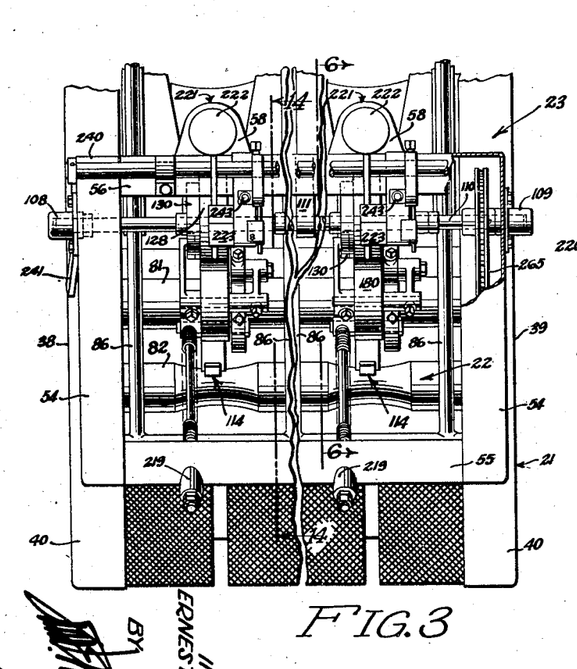
Fig. 3 is a fragmentary plan view of the printing mechanism of the machine.
Figure 4:
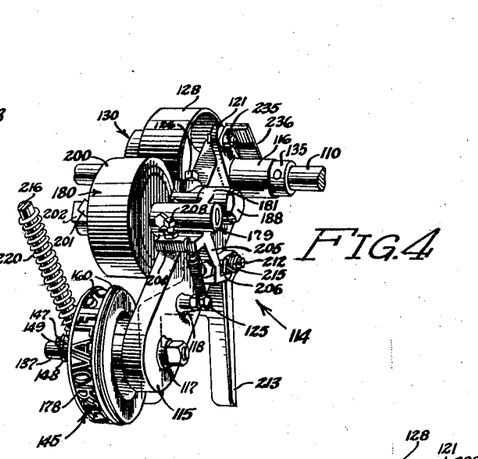
Fig. 4 is a perspective view of a printing unit of the printing mechanism.
Figure 5:
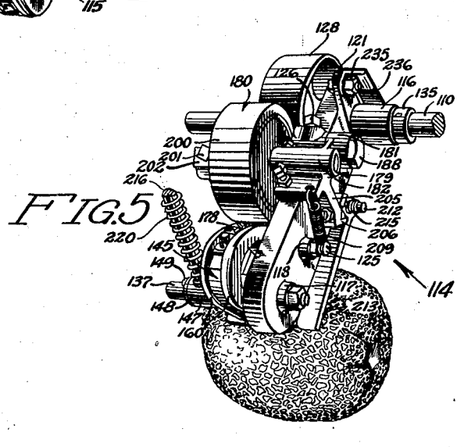
Fig. 5 is a view similar to Fig. 4 showing the ink fountain mechanism tripped by a melon so as to cause the printing die to be inked just prior to applying said die to said melon.

Rotatably mounted in suitable bearings provided on the channel beam 56 is an ink feeding control shaft 240, on one end of which is provided an arm 241 by which a rotational adjustment may be imparted to this shaft (see Figs. 1 and 3). For each of the units 114 the shaft 240 has an arm 242, on the end of which is rotatably provided a block 243 which threadedly receives a rod 244. The lower end of this rod extends downward through a suitable hole in the upper horizontal web of the beam 56 to within a short distance of the dog supporting spring 236 of this unit.

In each printing operation, such as is illustrated in Fig. 15, the chain housing arm 115 and parts assembled thereon are swung upwardly around the shaft 110 by contact of the printing rotor 145 with the rollable article 68 being marked. This rotation swings the spring 236 rearwardly moving the dog 237 away from the teeth on the ratchet wheel 230. As the rollable article 68 passes out of contact with the printing rotor 145, the spring 220 returns the arm 115 downwardly thus bringing the dog 237 into contact with the teeth of the ratchet wheel 230 and rotating this one or more teeth. The position of the lower end of the rod 244 of each of the units 114 relative to the spring 236 thereof determines how many teeth the ratchet wheel 230 is turned by each printing operation of that unit. Each of the rods 244 is lock-nutted but adapted for individual adjustment to produce uniform operation of the ink feeding devices 221 of all the printing units, and the shaft 240 is susceptible to rotation through the handle 241 to uniformly change the amount of ink fed by the pumps 223 of all the units 114 in case such adjustment becomes necessary.

The ink delivered from the pump 223 of each unit 114 to the fountain roller 128 of that unit is dropped onto a central zone on the periphery of that roller. It is desirable to remove all the ink from this roller except a thin band of ink which is just wide enough to ink the printing characters 178 of the rubber stamp 175 but not wide enough to spread ink onto the tires 160. For this purpose an ink shearing shoe 245 is positioned on the lower horizontal web of the channel beam 56 adjacent each roller 128 so as to be constantly pressed by a spring 246 against this roller. This shoe is best shown in Figs. 6 and 10 in which it is seen that it has an arcuate shearing face 250 which snugly fits the outer periphery of the fountain roller 128, there being an ink well 251 formed in the face 250 with oblique shearing edges 252 and a transverse bottom edge 253. It appears that the oblique shearing edges 252 have the effect of shearing the ink from the marginal portions of the fountain roller 128 contacted thereby, but that the transverse bottom edge 253 of the ink well 251 permits a certain portion of the ink on the surface of the fountain roller opposite this edge to be retained on the fountain roller and to be carried across that portion of the face 250 of the shearing shoe 245 which lies below the well edge 253. This narrow band of ink retained on the fountain roller is transferred to the flat tire 200 of the form roller 180 so that this form roller is adequately supplied with ink in the proper position to transfer this to the printing stamp 175 when the form roller and the type faces of this stamp are brought into contact.

Drive mechanism 24

The marking machine 20 is driven by a motor 258 through a belt 259 which turns a pulley 260 fixed on the shaft 72. This shaft has a sprocket 261 and the shafts 70, 71 and 110 have idle sprockets 262 and fixed sprockets 263 and 264 respectively, about which an endless chain 265 is trained. The shaft 70 also has a fixed sprocket 266 which is connected by a drive chain 267 to a pinion sprocket 268 fixed on shaft 71. Thus the motor 258 rotates the shaft 70 to drive the conveyor 22, the shaft 71 to drive the spinner belt 88 and rotate the rollers 81 and 82 reversely, and at the same time rotates the shaft 110 so as to constantly turn the fountain rollers 128, the form rollers 180 and the printing rotors 145 of all of the printing units 114.

Operation

With the motor 258 energized and thus running the various mechanisms of the machine 20, and with the ink reservoirs 222 supplied with ink, the machine is ready to have rotatable obejcts 68, which are shown as melons and which this machine is especially adapted to handle, being fed into the machine over the intake delivery board 53.

As previously explained, the upward slope of the inclined portion 85 of the conveyor 22 and the reverse rotation of rolls 81 and 82 prevents double-decking of the melons on this conveyor and causes these melons to seek positions of rest in which only one melon rides in the valley formed in each lane 87 between the rolls 81 and 82 of each of the pairs 80 of these rollers (as clearly shown in Fig. 1). The reverse spinning of the rollers in the inclined conveyor portion 85, together with the channels 84 in rollers 82, align the melons so that their major axes are disposed transversely of their direction of travel. While resting on the rollers 81 and 82, by which they were thus aligned, and without their alignment being disturbed, the melons are individually carried beneath the marking units 114, and the melons in each lane 87 marked by the unit 114 thereabove.

Before describing how these melons are so marked it is to be noted that each printing unit 114 includes means for preventing the type characters 178 of its stamp 175 from being inked excepting just before a melon 68 is delivered to this unit to be stamped. This means also provides for freshly inking the type characters 178 aforesaid in response to the delivery of a melon to this unit, so that each time these type characters are brought into contact with a melon they have just been freshly inked.

The prevention of the inking of the type characters 178 when no melons are being fed to a printing unit 114 is accomplished by the normal presence of the arm 215 of this unit opposite the set screw 207 thereof (see Fig. 15). As here shown, there is a slight space between the end of the arm 215 and screw 207 which is caused by contact of the cam roller 203 with the high sector 131 of the cam 130. When the cam 130 rotates so that the low sector 132 thereof is opposite the roller 203, the form roller supporting bracket 179 rocks downwardly about its shaft 185. If no melon is being carried by the conveyor 22 to be stamped by this printing unit during the current revolution of the rotor 145, the paddle 213 will remain in its normal position (see Fig. 15), in which the paddle arm 215 is disposed opposite the set screw 207. The downward rocking of the form roller bracket 179 just mentioned will in this case be halted by contact of the screw 207 with the arm 215 (see Fig. 13). As clearly shown in this figure, the downward movement of the form roller 180 is halted so that this remains out of contact with the type characters 178 on the rotor 145 during the current revolution of this rotor.

It is to be noted in Fig. 13 that when the form roller 180 is held out of contact with the type characters 178, by the set screw 207 engaging the paddle arm 215, the cam roller 203 is held a considerable distance away from the lower cam sector 132 of the cam 130. Whenever the arm 215 is swung out of the path of the set screw 207 (see Fig. 16) and the form roller bracket 179 thus freed to swing downwardly to allow the cam roller 203 to ride on the low cam sector 132, the form roller 180 is lowered so that when the type characters 178 are rotated opposite the roller 180 by the current revolution of the printing rotor 145, these type characters have rolling contact with the central inked zone on the periphery of the form roller 180 so as to freshly ink these type characters.

Figs. 15 and 16 clearly illustrate how the control of the inking of the type characters 178, above described, is effected by the melon themselves so that these type characters are inked just before their application to each melon fed to that unit 114, yet the inking of these characters is avoided during every revolution of the rotor 145 during which no melon is fed to this unit.

The conveyor 22 operates in timed relation with the printing mechanism 23 (see Figs. 15 and 16) so that a melon riding in a given lane 87 on any of the pairs 80 of conveyor rollers, as this pair comes under the corresponding unit 114, will contact the paddle 213 of that unit just before the cam roller 203 thereof rides off the high cam sector 131, so that when this cam roller does ride off this sector the form roller 180 of this unit will swing down into position to freshly ink the type characters 178 during the current revolution of the rotor 145. After actuating the paddle 213, this melon comes into contact with the rotor 145 just as the melon B is shown doing in Fig. 16. The rollers 81 and 82 are not preferably power rotated where these rollers pass under the printing units 114, but are adapted to be freely rotated by the melons as these are marked.

Each rotor 145 is of course itself continuously power rotated at such a speed as to make rolling contact with each melon conveyed thereby the conveyor 22. This rolling contact of each rotor with each melon being marked by it results in sufficient pressure between the melon and the rotor to lift the rotor and the housing arm 115 of this unit upwardly (see Fig. 15) as the melon passes therebeneath.

The stamp 175 and the resilient mounting of this is a very significant feature of the invention. Where these stamps were less resiliently mounted the machine was unable to stamp more than two or three cars of melons before the stamps were worn out. Operating with the stamps as shown, as much as 40 carloads of melons have been stamped by the machine 20 in actual practice with one set of stamps 175, the reason for this being as follows: In the rotor 145 the stamp 175 is allowed to yield under the pressure of its contact with a melon 68 so that the tires 160 come into engagement with the melon and assume most of the pressure exerted by the melon against the rotor which compresses the spring 220 and swings the chain housing arm 115, and associated parts, upwardly.

Another significant feature of the invention is the unbalanced shape of the rotor 145. In one sense, this may be defined as eccentric as the axis of rotation of the rotor is unequally spaced from different portions of the periphery of the latter. In fact, in the preferable form thereof disclosed herein, the rotor is substantially oval or elliptical in shape and the axis of rotation is located close to one end of the minor axis of the ellipse. The periphery of the rotor adjacent the axis is preferably flattened and the periphery on the opposite side of the rotor from the axis of rotation thereof is preferably made concentric with the axis of rotation so as to provide a base for the printing type on the rotor which may be inked easily by a rolling action of the type against the form roller 180. Thus, while the rotor 145 may be termed "eccentric" because the axis of rotation thereof is spaced some distance from its center of mass, it may also be termed "sector-like" in that the printing face thereof is preferably concentric with the axis and the entire rotor may be considered as a sector of a printing drum with the corners of the sector rounded so as to facilitate a smooth rolling relation between the rotor and the melon engaged thereby even when a non-concentric portion of the periphery of the rotor is in engagement with the melon, as shown in Fig. 16.

The eccentric or sector-like character of the rotor 145 produces many advantages. It is to be noted that this rotor is placed directly over the melon conveyor with its axis of rotation close to the path of melons on the conveyor, so as to be yieldable upwardly upon its being contacted by a melon. Also the rotor is rotated positively in timed relation with the conveyor so that the rotor rotates once each time a melon supporting valley passes therebeneath. The rotor is so timed that the minimum-radius face of the rotor is disposed downwardly each time a space between melons on the conveyor is passing directly beneath the rotor, and so that the printing or maximum-radius face of the rotor is disposed downwardly each time one of the melon supporting valleys is directly beneath the rotor.

These novel characteristics of the rotor 145 produce the following advantages:

(1) The peculiar shape of the rotor 145 is what permits its axis of rotation to be placed much lower than would be possible if it were a cylindrical and concentric printing drum with a uniform radius equal to the radius of the printing face thereof. On the other hand, the relatively low location of the axis of rotation of the rotor 145 permits a printing face on the rotor of relatively short radius to reach and print a stamp on a melon of the minimum diameter which the machine must operate upon. In other words, flattening one side of the rotor 145 to render the latter, in a sense, eccentric, makes it possible for the printing operation on a wide variety of sizes of melons to be performed with a printing face of smaller radius than would otherwise be necessary.

(2) The consequent decrease in the net size of the rotor 145 permits this smaller rotor to operate on melons varying widely in diameter with the melons in single file alignment and with a relatively short distance separating adjacent melons.

(3) Because the rotor 145 has such a relatively short periphery, it can be given one complete rotation while each melon passes therebeneath without the frictional contact between the rotor and the melon causing too rapid a rotation of the melon on its supporting conveyor rolls. Yet a large portion of the periphery of the rotor which contacts a given melon is uniformly disposed the maximum radius from the axis of the rotor and thus available for carrying printing type. It is thereby possible with the small rotor 145 to apply a relatively long mark to each melon.

(4) The use of a low axis of rotation for the printing rotor, as employed in my invention, would not be practical if the rotor periphery were of uniform radius. This is because with such a rotor, the initial contact between the rotor and a large size melon would be in a plane disposed perpendicularly to the plane common to the axes of the rotor and the melon, and the latter plane in such a case would be so high as to cause the rotor to push the melon backwardly out of the valley in which it rests. This of course would disorganize the whole operation of printing melons in such a machine and result in melons passing through the machine badly marked or not marked at all.

By virtue of its eccentric or sector-like shape, the rotor 145 initially contacts a large melon as shown in Fig. 16 in a plane disposed obliquely and at a positive angle with reference to the plane common to the axes of the rotor and the melons. Two things result from this.

First, the area of contact is disposed above the plane common to the axes of the rotor and melon, and a line drawn from the center of this initial contact area through the axis of the melon passes very close to, if not in front of the axis of the hindmost roller of the pair forming the valley supporting this melon. Thus, the force applied by the rotor to the melon tends to hold the melon in this valley rather than shift it rearwardly out of this valley.

A second result is that the positive angle of the plane of contact between the rotor and the melon in the initial engagement between the two, gives the rotor a good frictional bite on the surface of the melon and assures a snug rolling contact between the rotor and the melon as the rotor rides upwardly on the melon. A good impression of the type of the rotor on the melon is rendered certain by its being applied during such a positive well controlled rolling relationship between the type carrying rotor face and the melon.

Another advantage of the marking machine 20 is that the melons are separated, spaced and aligned on the conveyor and then they are marked while still resting on the same rollers that brought them into proper alignment for marking. In devices of the prior art the articles to be marked have been transferred from the aligning device to a printing device and the alignment of the articles was oftentimes disturbed by this transfer. Such a disturbance is not possible in the machine of my invention.

It is also an advantage to be able to separate and align ovaloid objects such as melons which require that these be elevated a distance from the point at which they are received in the machine and still be able, without a second handling of the fruit, to discharge it from the machine at substantially the same level at which it was received. This is made possible by returning the fruit downwardly from the upper end of the inclined section of the conveyor by providing the downwardly inclined section immediately following.

Simple means are provided in the machine 20 for securing the desired adjustments necessary in the printing units 114, these being illustrated in detail in Figs. 6 and 8. Rotational adjustment of the shaft 185 is for the purpose of maintaining the form roller 180 in constant contact with the fountain roller 128. The angular adjustment of the shaft 196 is to make certain that a line contact be maintained between the form roller 180 and the fountain roller 128.

The lock nutted set screw 208 in the lug 204 is to determine the downwardmost position which the form roller bracket 179 takes when it is freed from the restriction of the arm 215 and cam 130 and swings down to ink the type characters 178 on the rotor 145. By the adjustment of this screw, just that light contact between the form roller and the type characters is effected which is necessary to give a thin coating of ink to the type characters.

I claim:

1. In a printing machine the combination of: a travelling conveyor having valleys in which articles are adapted to be conveyed; a sector-like printing rotor carrying type and rotatably mounted on a horizontal axis to extend downwardly into the path of articles carried on said conveyor and being adapted to engage one of said articles with a non-concentric portion of said rotor and to yield upwardly in response to said engagement and in rolling contact with said article; and means for rotating said rotor continuously in timed relation with the movement of said conveyor so as to print said type on an article in each valley passing therebeneath and to make one revolution with each such printing.

2. In a printing machine the combination of: a travelling conveyor having valleys in which articles are adapted to be conveyed; a sector-like rotor carrying type on the periphery thereof and rotatably mounted on a horizontal axis closely adjacent to the upper limits of the path traversed by said articles on said conveyor, said rotor having concentric and non-concentric portions and yieldable upwardly in response to initial contact of a non-concentric portion of said rotor with one of said articles; and means for rotating said rotor in timed relation with the passage of said valleys therebeneath so that said type is brought into printing contact with the surface of each article travelling therebeneath in one of said valleys.

3. In a machine for printing on rollable articles the combination of: a conveyor having a series of closely-spaced valleys in which articles are adapted to be rollably supported; a sector-like rotor carrying type on the periphery thereof and rotatably mounted on a horizontal axis to extend downwardly into the path of articles carried on said conveyor and being adapted to engage one of said articles with a non-concentric portion of said rotor and to yield upwardly in response to said engagement and in rolling contact with said article; means for rotating said rotor synchronously with the travel of said valleys therebeneath so that with the passage of each such valley beneath said rotor said type on said rotor is applied to an article in said valley, if said valley contains an article, the rate of rotation of said rotor being such that said article is compelled to rotate during the application of said type thereto in order that rolling contact be maintained between said article and said rotor.

4. In a machine for printing on rollable articles the combination of: an endless conveyor having a series of rotatable rollers which are grouped together in pairs to provide an endless series of article-supporting valleys with two rollers in between each adjacent pair of valleys, articles being adapted to be rollably supported in said valleys; a sector-like printing rotor carrying type on the periphery thereof and rotatably mounted on a horizontal axis disposed closely adjacent to the upper limits of the path traversed by said articles on said conveyor, said rotor having concentric and non-concentric portions and yieldable upwardly in response to initial contact of said non-concentric portion of said rotor with one of said articles; and means for rotating said rotor continuously so that it rotates once for the passage of each valley therebeneath and so that said type is brought into printing contact with the surface of each article travelling therebeneath in one of said valleys.

5. In a printing machine the combination of: an oval shaped printing rotor having concentric and non-concentric portions; means for rotatably mounting said rotor on an eccentric axis, said means being adapted to yield upwardly in response to pressure from beneath against said rotor; means for rotating said rotor about said axis; type provided on the periphery of said rotor; and means for conveying rollable articles in a path which brings said articles into initial contact with said non-concentric portion of said rotor from beneath and in timed relation with the rotation of said rotor so that said type is applied to each of said articles, said axis being disposed close to the upper limits of said path.

6. A combination as in claim 5 in which the axis of said rotor is disposed on the opposite side of the center thereof from said type.

7. A combination as in claim 5 in which said conveying means rotatably supports the articles fed into contact with the rotor so as to permit said articles to rotate in response to the rotation of said rotor.

8. In a printing machine the combination of: means for feeding rollable articles varying in diameter along a given path; a printing rotor; means for rotatably mounting said rotor on an eccentric axis adjacent said path, said means being adapted to yield away from said path in response to pressure by one of said articles thereagainst; means for rotating said rotor about said axis in timely relation with the conveying of articles past said rotor; type provided on the periphery of said rotor on a portion thereof disposed on the opposite side of the center of the rotor from said axis; and tread means on the periphery of said rotor for engaging an article contacting said rotor whereby said rotor is held in rolling contact with said article while said type is applied thereto.

9. A combination as in claim 8 in which said tread means extends entirely around said rotor so as to cause the latter to climb up onto the larger of said articles thereby maintaining said rotor in rolling contact with said larger article and preventing said article being pushed backwardly by contact with said rotor.

ERNEST A. VERRINDER.

REFERENCES CITED

The following references are of record in the file of this patent:

UNITED STATES PATENTS

| Number | Name | Date |
|---|---|---|
| 1,369,570 | Stiles | Feb. 22, 1921 |
| 1,422,017 | Wood | July 4, 1922 |
| 1,549,595 | Merrill | Aug. 11, 1925 |
| 2,040,526 | Mumma | May 12, 1936 |
| 1,656,494 | Nutt et al. | Jan. 17, 1928 |
| 884,031 | Mountford | Apr. 7, 1908 |
| 1,012,156 | Ranz | Dec. 19, 1911 |
| 2,152,204 | Moore | Mar. 28, 1939 |
| 1,386,812 | Thompson | Aug. 9, 1921 |
| 1,364,815 | Santee | Jan. 4, 1921 |
| 1,248,856 | Henry | Dec. 4, 1917 |
| 1,421,292 | Neuenschivander | June 27, 1922 |
| 1,569,208 | Sevigne | Jan. 12, 1926 |
| 1,104,367 | Matthews | July 21, 1914 |
| 2,134,041 | Hamm | Oct. 25, 1938 |
| 913,018 | Lawrence | Feb. 23, 1909 |
| 2,272,677 | Meneray et al. | Feb. 10, 1942 |
| 1,283,949 | Stevenson | Nov. 5, 1918 |
| 2,240,443 | Paul | Apr. 29, 1941 |
| 1,606,190 | Sharp | Nov. 9, 1926 |
| 1,992,347 | Bartlett | Feb. 26, 1935 |
| 1,506,661 | Pannier | Aug. 26, 1924 |
| 1,284,031 | Ahlburg | Nov. 5, 1918 |
| 2,079,300 | Nunnikhoven | May 4, 1937 |
| 423,394 | Saxton | Mar. 11, 1890 |
| 1,527,921 | Rodriguez | Feb. 24, 1925 |
| 1,475,687 | Cobb | Nov. 27, 1923 |